UNITED STATES PATENT OFFICE.

MORITZ ULRICH, OF ELBERFELD, GERMANY, ASSIGNOR TO THE FARBEN-FABRIKEN OF ELBERFELD COMPANY, OF NEW YORK.

BLUE DYE AND PROCESS OF MAKING SAME.

SPECIFICATION forming part of Letters Patent No. 611,664, dated October 4, 1898.

Application filed November 4, 1897. Serial No. 657,442. (Specimens.) Patented in France March 27, 1897, No. 265,446; in Belgium April 24, 1897, No. 127,837, and in Austria May 18, 1897, No. 47/1,784.

*To all whom it may concern:*

Be it known that I, MORITZ ULRICH, doctor of philosophy, chemist, residing at Elberfeld, Germany, (assignor to the FARBENFABRIKEN OF ELBERFELD COMPANY, of New York,) have invented a new and useful Improvement in the Manufacture of Blue Dye, (for which the Farbenfabriken, vormals Fr. Bayer & Co., of Elberfeld, Germany, have already obtained Letters Patent in France, No. 265,446, dated March 27, 1897; in Belgium, No. 127,837, dated April 24, 1897, and in Austria, No. 47/1,784, dated May 18, 1897;) and I hereby declare the following to be a clear and exact description of my invention.

My invention relates to the production of a new class of monoazo dyestuffs by combining one molecule of the diazo derivative of a so-called periamidonaphtholsulfo-acid, such as 1.8 amidonaphthol 3.6 disulfo-acid, 1.8 amidonaphthol 4 monosulfo-acid, or the like with one molecule of a substituted 1.8 naphthylaminsulfo-acid having the general formula

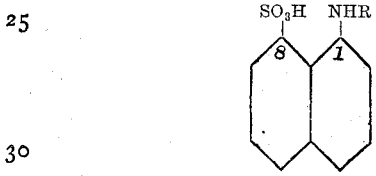

(in which formula R represents an aromatic radicle, such as phenyl, tolyl, or the like.)

The dyestuffs thus obtained represent when dry and pulverized dark powders which dissolve in water with from reddish-blue to blue color and yield on unmordanted wool from reddish-blue to blue shades which are fast to acids, to alkalies, and to light.

In carrying out my new process practically I can proceed as follows: 31.9 kilos, by weight, of the 1.8 amidonaphthol 3.6 disulfo-acid are diazotized in the usual manner by means of 6.9 kilos, by weight, of sodium nitrite. The precipitated diazo compound is separated by filtration from the acid solution, and the residue remaining on the filter is changed into a liquid paste by the addition of water. This paste is added (while stirring) to a solution of thirty kilos, by weight, of 1 phenylamidonaphthalene 8 sulfo-acid (or of the corresponding quantity of 1 tolylamidonaphthalene 8 sulfo-acid) and of forty kilos, by weight, of sodium acetate in fifteen hundred liters of water. The stirring is continued until the formation of the dyestuff is finished, which stage will be reached after about four hours. The dyestuff separates during the process as a dark precipitate with metallic luster. It is filtered, dried, and pulverized.

It is the sodium salt of an acid which (in case 1 phenylamidonaphthalene 8 sulfo-acid is employed) has the formula

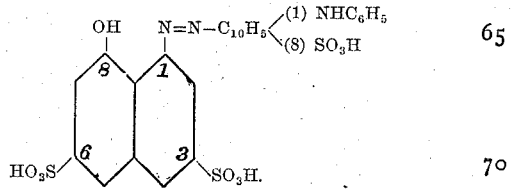

When dry and pulverized, the new dyestuff represents a dark-blue powder easily soluble in water with a blue color, in a twenty-per-cent. ammonia solution with a red color, and in concentrated hydrochloric acid (containing 36.5 per cent. of HCl) with a greenish-blue color.

My new coloring-matter dyes unmordanted wool in acid-baths blue shades which are fast to acids, to alkalies, and against the action of light.

Having now described my invention and in what manner the same is to be performed, what I claim as new, and desire to secure by Letters Patent, is—

1. The process for producing new monoazo dyestuffs by combining one molecule of a diazotized periamidonaphtholsulfo-acid, such as 1.8 amidonaphthol 3.6 disulfo-acid, with one molecule of a monosubstituted 1.8 naphthylaminsulfo-acid of the general formula:

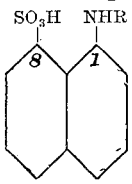

in which formula R represents an aromatic radicle such as phenyl, in the manner hereinbefore described.

2. The process for producing a new monoazo dye-stuff by combining one molecule of diazotized 1.8 amidonaphthol 3.6 disulfo-acid with one molecule of 1 phenyl or tolylnaphthylamin 8 sulfo-acid in the manner hereinbefore described.

3. As new articles of manufacture the monoazo dyestuffs derived from diazotized peri-amidonaphtholsulfo-acids, such as 1.8 amidonaphthol 3.6 disulfo-acid, by combination with monosubstituted 1.8 naphthylaminsulfo-acids, being dark powders soluble in water with from reddish-blue to blue color and yielding on unmordanted wool in acid-baths from reddish-blue to blue shades which are fast to acids, to alkalies and to light.

4. As a new article of manufacture the new dyestuff derived from diazotized 1.8 amidonaphthol 3.6 disulfo-acid, by combination with phenylnaphthylaminsulfo-acid, being an alkaline salt of an acid, having the formula:

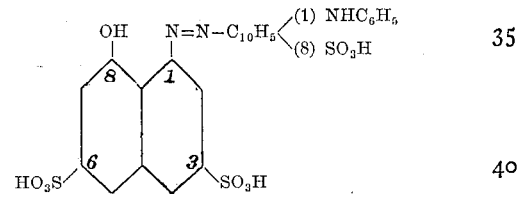

which is a dark-blue powder easily soluble in water with a blue color, soluble in a twenty-per-cent. ammonia solution with a red color and in concentrated hydrochloric acid containing 36.5 per cent. of HCl with a greenish-blue color, yielding on unmordanted wool in acid-baths blue shades which are fast to acids, to alkalies and against the action of light.

In testimony whereof I have signed my name in the presence of two subscribing witnesses.

MORITZ ULRICH.

Witnesses:
R. E. JAHN,
OTTO KÖNIG.